United States Patent [19]
Workman, Jr. et al.
[11] 3,960,035
[45] June 1, 1976

[54] TORQUE RESPONSIVE SPEED SHIFTING MECHANISM FOR POWER TOOL

[75] Inventors: William Workman, Jr.; Joseph F. Carter, both of Spring Lake, Mich.

[73] Assignee: Gardner-Denver Company, Dallas, Tex.

[22] Filed: Nov. 1, 1974

[21] Appl. No.: 519,975

[52] U.S. Cl. .............................. 74/785; 192/56 F; 192/67 R

[51] Int. Cl.² .................. F16D 25/00; F16D 13/22; F16D 43/20; F16H 57/10

[58] Field of Search ................. 192/86, 67 R, 56 F, 192/54; 74/785

[56] References Cited

UNITED STATES PATENTS

| | | | |
|---|---|---|---|
| 2,734,400 | 2/1956 | Andershock | 74/785 |
| 2,964,152 | 12/1960 | Banner | 192/56 F |
| 3,393,754 | 7/1968 | Hachemeister | 192/56 F X |
| 3,487,901 | 1/1970 | Kulman | 192/86 X |
| 3,739,659 | 6/1973 | Workman, Jr. | 192/56 F X |

FOREIGN PATENTS OR APPLICATIONS

| | | | |
|---|---|---|---|
| 647,508 | 6/1937 | Germany | 192/86 |

*Primary Examiner*—Samuel Scott
*Assistant Examiner*—Lance W. Chandler
*Attorney, Agent, or Firm*—Michael E. Martin

[57] ABSTRACT

A speed shifting mechanism for a pneumatic wrench or nutsetter comprises a planetary gear arrangement in the drive mechanism of the wrench in which the planet gear carrier is connected to the driver clutch member of a torque responsive clutch and the planetary ring gear is mounted in a one way clutch to provide for unidirectional rotation of the ring gear. The torque responsive clutch is of the sloping tooth type and the driving clutch member is connected to a piston having opposing faces and fitted in the tool housing to form opposed fluid chambers. Pressure fluid is admitted to one of the chambers at a controlled pressure to act on the piston for holding the clutch in the engaged condition. Movement of the driving clutch member at torque causes pressure fluid at the controlled pressure to be vented and the opposite chamber to become pressurized thereby acting on the clutch to disengage and enable the planetary gear arrangement to become operative to reduce the output speed of the wrench.

11 Claims, 10 Drawing Figures

TORQUE RESPONSIVE SPEED SHIFTING MECHANISM FOR POWER TOOL

BACKGROUND OF THE INVENTION

This invention relates to improvements in pneumatic wrenches of the type which include transmission means between the tool drive motor and the output spindle which is capable of changing the speed of the output spindle from a relatively high speed and low torque operating condition to a comparatively low speed and high torque operating condition. It is known in the art of pneumatic wrenches to provide mechanism for operation of the wrench to thread a fastener at relatively high speed during the so-called free rundown portion of the wrench operating cycle and then to also provide maximum driving torque during the final fastener tightening process. Such operation may be provided in tools having a single drive motor utilizing change speed transmission gearing together with suitable torque sensing mechanism to effect a shifting operation to decrease the output spindle speed and increase the torque output in response to a predetermined torque reaction in the drive mechanism of the wrench. U.S. Pat. No. 3,739,659 issued to William Workman, Jr. and assigned to Gardner-Denver Company discloses a speed shifting mechanism for a pneumatic wrench or nutsetter of the general type discussed hereinabove. The present invention is directed to improvements in torque responsive speed shifting mechanisms generally of the type disclosed in the above mentioned patent.

It is desirable to provide pneumatic wrenches or nutsetters which are adaptable for use as single spindle units either hand held or base mounted or as a multiple unit arrangements for tightening a plurality of fasteners generally simultaneously. In many plural fastener joining operations it is desirable to commence the final torquing of all fasteners at the same time or in a predetermined sequence. Accordingly, a wrench shifting mechanism which is suitable for single wrench units as well as multiple spindle arrangements should be capable of being controlled to shift automatically at a predetermined torque reaction in the tool drive means or to shift in response to an external signal so that simultaneous shifting or predetermined sequence shifting of all spindles in a multiple wrench may be obtained.

SUMMARY OF THE INVENTION

The present invention provides an improved speed shifting mechanism for fluid operated power wrenches or the like which is adaptable to be used in wrench units having a single output drive spindle or in multiple spindle arrangements.

The present invention also provides a shifting mechanism for power wrenches which includes improved means for controlling the tool drive torque at which shifting occurs. With the shifting mechanism of the present invention the torque at which shifting is initiated may be varied by controlling fluid pressure acting on a piston connected to a movable clutch member of a torque responsive clutch interposed in the drive means of the tool.

The shifting mechanism for power wrenches in accordance with the present invention is also adaptable to be used in multiple wrench unit arrangements wherein a control system associated with the multiple spindle arrangement may provide for all drive spindles to be shifted to the lower speed simultaneously or in a predetermined sequence. The shifting mechanism of the present invention is capable of producing a fluid pressure signal when a predetermined tool driving torque is reached which signal may be used to indicate that the particular associated wrench unit is ready for shifting to the low speed and high torque operating mode.

The present invention further provides a multiple wrench arrangement including a control system therefor which is operable to drive a plurality of fasteners generally simultaneously at a relatively high speed and, after all fasteners have been tightened to a predetermined torque then shift each wrench unit to the low speed and high torque driving mode at the same time.

DESCRIPTION OF THE PREFERRED EMBODIMENTS

Figure 1:
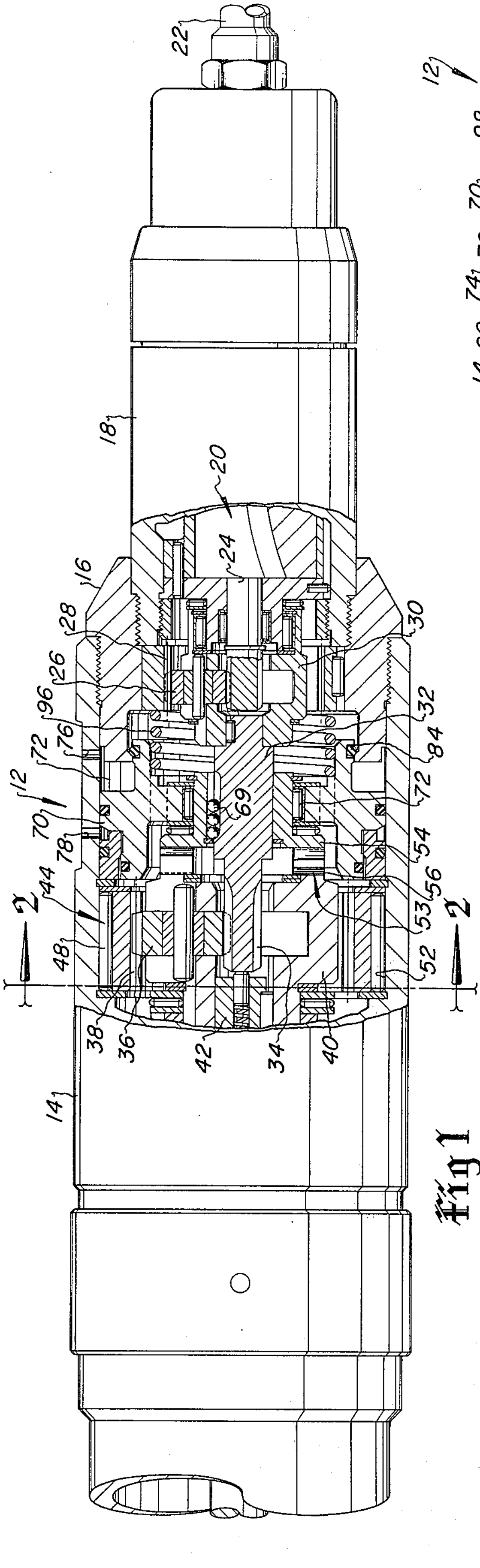
FIG. 1 is a longitudinal section view of a pneumatic wrench unit including the torque responsive shifting mechanism of the present invention.
Figure 3:
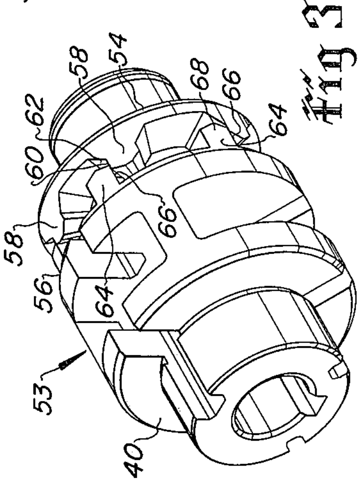
FIG. 3 is a perspective view of the driving and driven clutch members of the torque responsive clutch embodied in the present invention.
Figure 2:
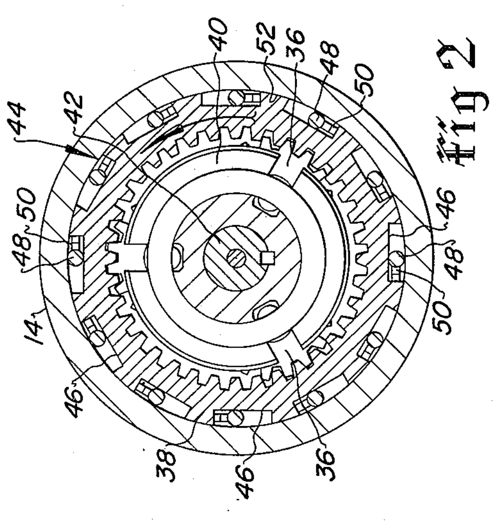
FIG. 2 is a transverse section view taken from the line 2—2 of FIG. 1.

Referring to FIGS. 1, 2 and 3 the present invention is embodied in a pneumatic tool for driving threaded fasteners generally designated by the numeral 12. The tool 12 comprises a housing made up of an elongated tubular member 14, an intermediate member 16 threadedly connected to the tubular member 14, and a motor housing portion 18. A rotary vane fluid operated motor 20 of conventional construction is disposed in housing portion 18 and is adapted in a well known way to receive pressure fluid such as compressed air from a suitable source by way of a conduit 22. The motor 20 includes a rotatable drive rotor 24 having a portion comprising the sun gear of a planetary gear set which includes planet gears 26 and a stationary ring gear 28. A planet gear carrier 30 is suitably keyed to a rotor member 32 for drivably rotating the same in response to rotation of the motor rotor 24. The rotor 24 may also, of course, be directly connected to or comprise a part of the rotor member 32 if it was deemed desirable to eliminate the above mentioned planetary gear set.

The rotor member 32 includes an integrally formed toothed portion 34 which forms a sun gear for a second planetary gear set including planet gears 36 enmeshed with a ring gear 38. The planet gears 36 are rotatably supported on a rotatable planet gear carrier 40 which is suitably supported for rotation in the housing member 14 and is drivingly connected to a spindle 42. As shown in FIG. 2 also, the ring gear 38 is disposed for rotation with respect to the tubular housing member 14 in the direction of the arrow shown in FIG. 2. The ring gear 38 includes a one way clutch generally designated by the numeral 44 which is operable to prevent rotation in the clockwise direction opposite to that indicated by the arrow in FIG. 2. In the embodiment shown the one way clutch 44 is formed by a plurality of longitudinal recesses 46 disposed around the periphery of the ring gear 38. The recesses 46 include inclined bottom surfaces upon which are disposed rollers 48 which are biased by springs 50 into a position wherein they tend to be wedged between the bottom surfaces of recesses 46 and the inner cylindrical wall 52 of the tubular member 14. This wedging action is increased in response to the ring gear tending to rotate opposite to the direction indicated by the arrow in FIG. 2 and, accordingly, the ring gear 38 is prevented from rotating in said direction. In response to rotation of the ring gear 38 in the direction of the arrow in FIG. 2 the rollers 48 are forced into the deeper portions of the recesses 46 and do not act to prevent rotation of the ring gear. The above described one way clutch 44 is similar to the one way clutch disclosed in U.S. Pat. No. 3,739,659.

The tool 12 is also characterized by a sloping tooth type clutch 53 comprising a driving clutch member 54 and a driven member 56 formed integral with the planet gear carrier 40. As shown in FIG. 3 also the driving clutch member 54 includes a plurality of axially projecting teeth 58 formed to have flat surface portions 60 which are aligned with the rotational axis of the clutch member 54. The surfaces 60 intersect axially sloping surfaces 62. The teeth 58 are provided for driving engagement with coacting teeth 64 disposed on the driven clutch member 56. The teeth 64 have axially aligned flat surfaces 66 which intersect crown portions 68. The driving clutch member 54 is mounted on the rotor member 32 and is keyed for rotation with the rotor member by a plurality of spherical ball keys 69. The clutch member 54 is axially movable on the rotor member 32 for moving into and out of engagement with the clutch member 56. When the teeth of clutch member 56 are fully axially engaged with the teeth 58 the edges formed between the crowns 68 and surfaces 66 are in driving engagement with the sloping surfaces 62. Accordingly, an axial force tending to separate the teeth 58 from the teeth 64 is created which is proportional to the driving torque transmitted through the clutch and when a separating force is generated which is great enough to overcome an opposing force holding the clutch engaged the driving member 54 will move axially away from driven member 56 until only the longitudinal or axially aligned flat surfaces 60 are in driving engagement with the flat surfaces 66.

Figure 4:
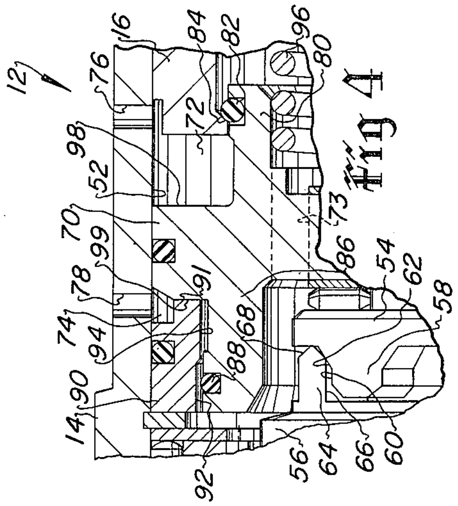
FIG. 4 is a partial section view of the piston of the shift mechanism shown in the position of FIG. 1.

The speed shifting mechanism of the tool 12 is further characterized by a piston 70 disposed on the clutch member 54 for axial movement therewith. Suitable bearing means 72 are provided to permit substantially friction free rotation of the clutch member 54 with respect to the piston. The piston 70 is closely fitted in the interior of the tubular housing member 14 and is sealingly engaged with the interior wall surface 52 to form first and second opposed chambers 72 and 74. Ports 76 and 78 open through the wall of the housing member 14 to the respective chambers 72 and 74. The piston 70 includes a first axially projecting annular flange 80 supporting an O-ring 82 for sealing engagement with a seat formed by a radially inwardly projecting lip or edge 84 disposed on the member 16, as shown in FIG. 4. The piston 70 includes a second axially projecting annular flange 86 opposed to the flange 80 and also supporting an O-ring 88. The flange 86 projects into a stepped bore formed in a stationary sleeve 90, the bore being formed by cylindrical wall surfaces 92 and 94. The wall surface 92 is formed great enough in diameter to provide an annular space around the periphery of the O-ring seal 88 while the surface 94 is proportioned to form a seat to sealingly engage the O-ring 88 when the piston moves axially away from the driven clutch member 56.

The annular flanges 80 and 86 comprise valve closure means for alternately venting and closing the respective chambers 72 and 74 in response to movement of the driving clutch member 54. This venting and closing action, when pressure fluid is supplied to the chambers 72 and 74, may be used to control the engaging and disengaging action of the clutch and, accordingly, the output speed of the spindle 42 with respect to the rotor member 32 as will be explained further herein.

The driving and driven clutch members 54 and 56 are biased into total engagement by a coil spring 96 and by pressure fluid admitted to the chamber 72 as long as the chamber is closed by the O-ring 82 being seated against the lip 84. Moreover, by regulating the pressure of fluid in chamber 72 a pressure force acting on face 98 of the piston 70 may be varied in accordance with the fluid pressure to oppose the force acting to separate the clutch members 54 and 56. In this way the torque transmitted through the clutch at which the clutch member 54 starts to separate from clutch member 56 may be controlled by varying the fluid pressure in chamber 72.

Figure 9:
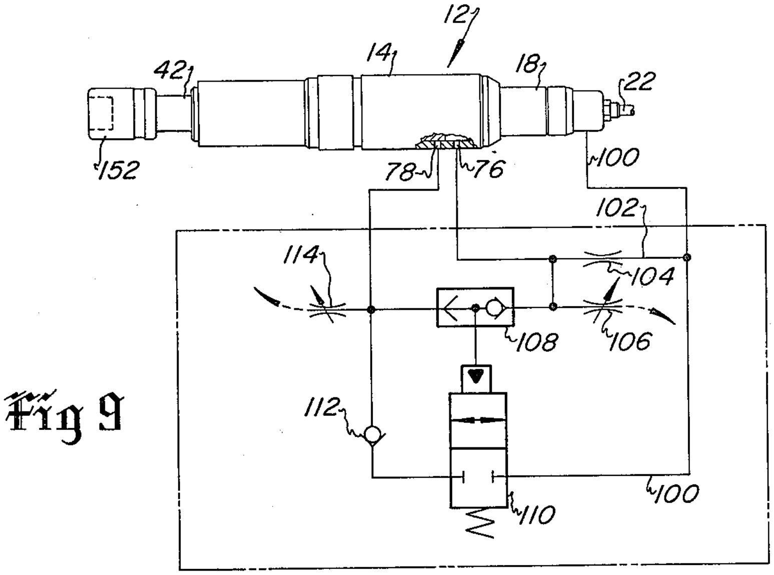
FIG. 9 is a schematic view of a fluid control circuit for adjusting the fluid pressure acting on the clutch piston to hold the clutch in the engaged position; and, FIG. 10 is a schematic view of a fluid control circuit for a multiple spindle arrangement using individual wrench units having shifting mechanisms in accordance with the present invention.

Referring to FIG. 9, a pressure fluid control circuit for controlling the operation of a single tool 12 is schematically illustrated. The control circuit includes a conduit 100 connected to the tool housing portion 18 to receive pressure fluid through suitable passage means, not shown, which is in communication with the conduit 22. A conduit 102 including a restrictive orifice 104 is suitably connected to port 76. A variable restrictive orifice or bleed valve 106 is in communication with conduit 102 and an open center shuttle or double check valve 108. The check valve 108 is arranged to supply pressure fluid to the pilot operator of a normally closed valve 110 which valve is pilot operated by pressure fluid to open. The valve 110 is interposed in conduit 100 as is a check valve 112. The conduit 100 is suitably connected to port 78 and includes a branch conduit leading to the opposite side of double check valve 108. Conduit 100 is also in communication with a bleed valve 114. With the fluid control circuit of FIG. 9 pressure fluid may be supplied at controlled pressure to chamber 72 for automatically shifting the output speed of the tool spindle 42 in response to a predetermined torque being transmitted through the clutch 53.

Referring to FIGS. 1, 2, and 4 through 9 the operation of the speed shifting mechanism of the tool 12 will now be described. Prior to commencement of an operating cycle of the tool the driving clutch member 54 will be fully engaged with the driven member 56, as shown in FIGS. 1 and 4 due to the coil spring 96 providing a light engaging force. The engagement of the teeth 58 with teeth 64 is limited by the piston face 99 abutting against an end face 91 of the sleeve 90. In this position the O-ring 88 is disposed in the bore portion formed by wall surface 92 and the chamber 74 is vented to the interior of the housing 14. In the position of the piston 70 and clutch member 54 shown in FIGS. 1 and 4 the O-ring 82 is sealingly engaged with the lip 84. Suitable exhaust port means, not shown, communicate with the interior of housing 14. The engagement of piston face 99 with end face 91 does not provide a fluid tight seal for chamber 74. With the control circuit of FIG. 9 pressure air is not supplied to either chamber 72 or chamber 74 until the motor 20 is energized by supplying pressure air to conduit 22. Upon energizing the motor 20 by supplying pressure fluid (air) to conduit 22 the chamber 72 also is rapidly pressurized to a predetermined pressure as regulated by the setting of bleed valve 106. At the onset of pressurization of the conduit 102 and chamber 72 there is a slight delay in opening of the valve 110 as determined by the time required for pressure to increase in the valve pilot operator sufficiently to overcome the bias spring holding the valve closed. This time delay, concomitant with the startup of the motor, prevents premature clutch disengagement which might occur due to momentary high torque caused by drive train inertia or resistance to starting. Since the chamber 74 is not provided with pressure fluid during this time delay period and if the clutch member 54 should move to disengage there would be no pressure force acting on piston face 99 to cause total disengagement.

With the motor 20 running to effect anticlockwise rotation of the rotor member 32, viewing FIG. 2, and with the clutch 53 engaged as shown in FIGS. 1 and 4 the planet gear carrier 40 and the ring gear 38 will rotate at the speed of the rotor member, and also anticlockwise. Accordingly, the spindle 42 will be rotated at the speed of the rotor member 32. As the torque transmitted through clutch 53 increases due to resistance of rotation of the driven fastener, or the like, the driving member 54 will, at a predetermined torque, start to move away from the driven clutch member 56 due to the reaction forces acting on the interengaged clutch teeth 58 and 64. Initial movement of the driving member 54 will cause unseating of the O-ring 82 from the lip 84 and venting of the chamber 72 to the interior of housing 14 will occur. Suitable openings 73 in the piston 70 provide for fluid flow into the housing 14 wherein the clutch 53 and gears 36 and 38 are disposed. The sudden drop in pressure in chamber 72 will result in rapid movement of the driving clutch member 54 and the piston 70 to the position shown in FIGS. 5 and 7.

Figure 6:
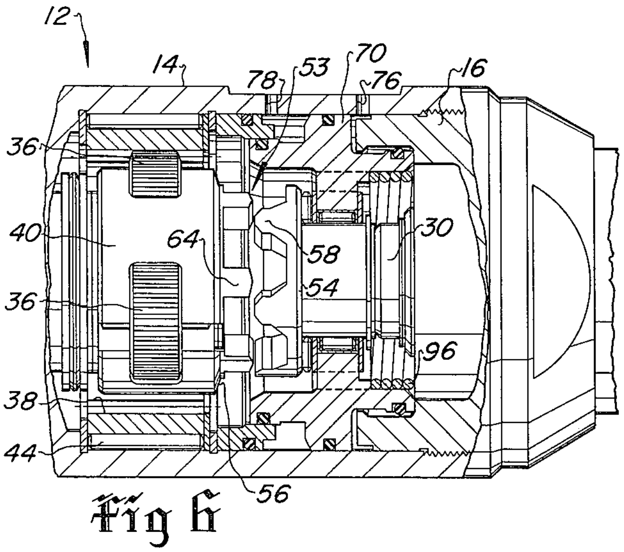
FIG. 6 is a view similar to FIG. 5 showing the clutch in the disengaged position.
Figure 5:
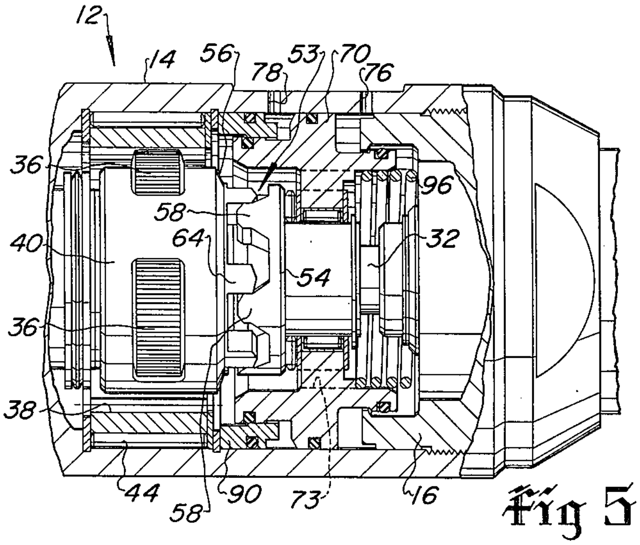
FIG. 5 is a section view taken along the same line as the view of FIG. 1 showing the clutch of the shift mechanism in the intermediate position.
Figure 7:
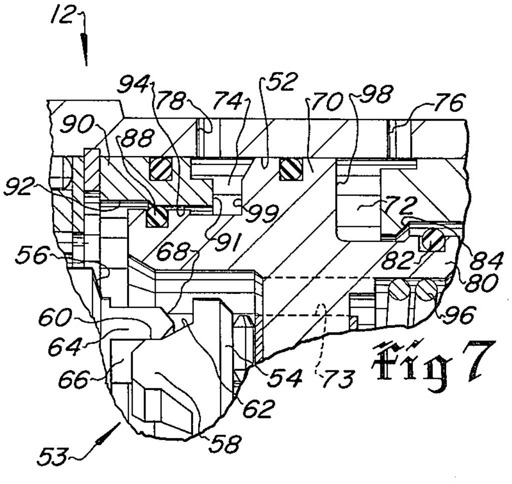
FIG. 7 is a view similar to the view of FIG. 4 showing the piston and clutch on a larger scale in the position of FIG. 5.

In the position of FIGS. 5 and 7 the driving clutch member 54 has moved to a position wherein the surfaces 60 of teeth 58 are engaged with the cooperating surfaces 66 of the teeth 64 and the clutch is still in driving engagement. However, no further separating force is caused by the interacting clutch teeth 58 and 64 in the position shown in FIG. 5. As the piston 70 moves with the clutch member 54 to the FIG. 5 position the O-ring 88 sealingly engages the surface 94 and the chamber 74 becomes substantially fluight tight. If pressure fluid is being supplied to chamber 74 a rapid pressure rise will occur therein which will act on piston face 99 to rapidly move the driving clutch member 54 together with the piston 70 to the position shown in FIGS. 6 and 8.

In the position of the driving clutch member 54 shown in FIG. 6 the clutch 53 has become disengaged and the rotor member 32 now rotatably drives the planet gears 36. Such driving action on the planet gears 36 causes a reaction force tending to rotate the ring gear 38 clockwise or opposite the direction of the arrow in FIG. 2. The one way clutch 44 formed on the ring gear 38 prevents clockwise rotation, viewing FIG. 2, and accordingly the planet gear carrier 40 is forced to rotate anticlockwise at a reduced speed with respect to the rotor member 32. Accordingly, disengagement of the clutch 53 causes the speed of the output spindle 42 to be shifted from a relatively high speed to a lower speed with a resultant increase in driving torque being imposed on the fastener being tightened. The motor then continues to drive the spindle 42 at the low speed and high torque condition until the motor stall torque is reached or the motor is shut off by suitable control means.

Figure 8:
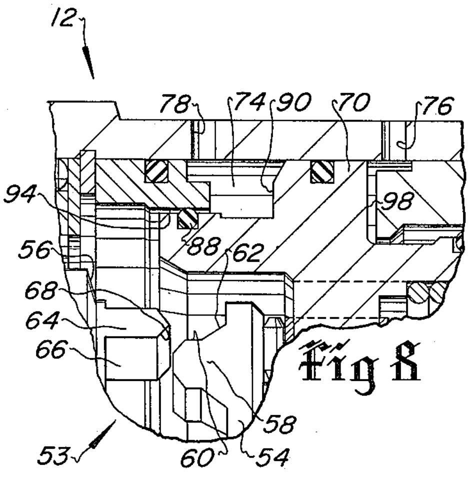
FIG. 8 is a view similar to FIG. 7 showing the piston and clutch in the position of FIG. 6.

Referring to FIG. 9 the control circuit shown is adapted to maintain the shift mechanism of the tool 12 in the condition illustrated in FIGS. 6 and 8 momentarily after pressure fluid to conduits 22 and 100 is shut off. The momentary holding of the clutch driving member 54 in the disengaged position is provided by check valve 112 and bleed valve 114 which prevents rapid depressuraization of the chamber 74 and allows the spindle to relax its torque effort on the driven fastener to permit easy withdrawal of the tool off of the fastener itself. Such relaxing or minute reverse rotation of the spindle is not possible when the clutch 53 is engaged because the planet gear carrier 40 cannot rotate with respect to the ring gear 38 and the ring gear itself cannot rotate clockwise due to the one way clutch 44. When the chamber 74 has become depressurized by bleeding pressure fluid through bleed valve 114 the spring 96 moves the clutch member 54 back to the position of FIG. 1.

As previously mentioned the shift mechansim of the present invention is particularly suitable for use in multiple spindle nutsetter apparatus wherein it is desirable to shift all spindles to the low speed and high torque operating mode simultaneously or in a predetermined sequence. The shifting can be controlled by controlling the admission of pressure fluid to chamber 74. The absence of pressure fluid in chamber 74 at sufficient pressure to force the piston 70 to move driving clutch member 54 from the position shown in FIG. 5 to the position shown in FIG. 6 will result in the clutch 53 remaining drivingly engaged wherein the output spindle will have a relatively low torque exerted on it, namely the torque exerted by the rotor member 32.

Figure 10:
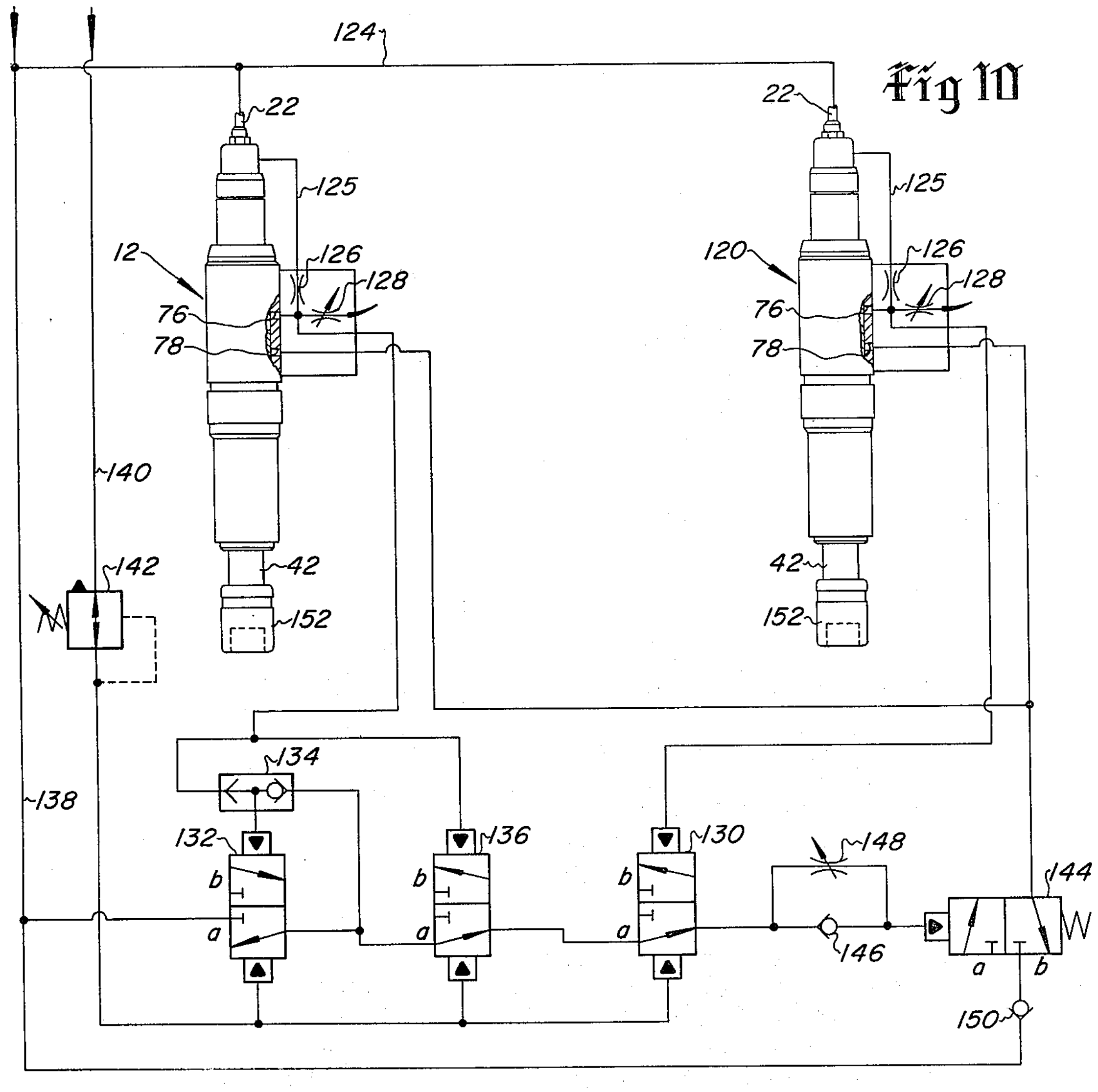

Referring to FIG. 10 a control circuit is disclosed which is operable to cause both spindles of a two-spindle nutsetter apparatus to shift simultaneously and only after the speed shift mechanism of both tools have become ready for shifting from the high speed and low torque operating mode to the comparatively low speed and high torque operating mode. The nutsetter apparatus includes two tools 12 and 120 which are constructed the same and differ only in the way they are connected to the control circuit of FIG. 10. Each tool 12 and 120 has an output spindle 42 and a fastener engaging socket 152 drivenly connected thereto. Each tool is connected to receive pressure fluid from a conduit 124 connected to a suitable pressure fluid source, not shown, which may be switched on or off. Ports 76 on each tool are adapted to receive pressure fluid through suitable conduit means 125 at a regulated pressure as determined by a restriction 126 and a bleed valve 128. The port 76 of tool 120 is also connected to a pilot operator of a two-position pilot operated valve 130. Port 76 of tool 12 is connected to a pilot operator of a two-position pilot operated valve 132 by way of a double check valve 134. Port 76 of tool 12 is also connected to a pilot operator of a two-position valve 136. The valves 132, 136, and 130 are connected in series. Valve 132 is also connected to a conduit 138 to receive pressure fluid therefrom. The valves 130, 132 and 132 and 136 are also connected to receive an uninterrupted supply of pilot operator pressure fluid from a conduit 140 by way of a pressure regulator 142.

The control circuit of FIG. 10 further includes a normally closed two-position valve 144 which is operable in position *a* to conduct pressure fluid to the ports 78 of tools 12 and 120 to cause the clutches of each tool to disengage to effect downshifting of the output speed of the spindles 42. The pilot operator of valve 144 is connected to receive pressure fluid from valve 130 by way of a check valve 146 and a restricted bypass conduit 148.

Prior to the commencement of an operating cycle of the apparatus shown schematically in FIG. 10 it is assumed that valves 130, 132, and 136 are all in the position designated *a* in FIG. 10 and valve 144 is in position *b*. This condition of the respective valves is assured if pressure fluid is supplied to conduit 140 but not to conduit 138. When pressure fluid is supplied to conduits 124 and 138 the motors of each tool will commence running and pressure fluid supplied to each port 76 will hold the respective clutches engaged. Valves 130 and 136 will be shifted to position *b* when the pressure to the respective pilot operators of each valve increases sufficiently to overcome the bias of pressure fluid acting on the respective opposing pilot operators. Valve 132 is also shifted to position *b* when pressure has increased sufficiently in the circuit connected to port 76 of tool 12. Valve 132 is provided to prevent a premature signal from being conducted to valve 144 which would be caused due to delay in shifting either one of valves 130 or 136 at the start of an operating cycle. Since valve 132 is connected in circuit with its own pilot operator by way of shuttle valve 134 it remains in position *b*, once shifted to that position, as long as pressure fluid at sufficient pressure is supplied through conduit 138.

When the respective tools 12 and 120 have reached a torque output sufficient to shift their respective clutches to the position of FIGS. 5 and 7 ports 76 will be vented through chamber 72 and the associated valve 136 or 130 will shift to position *a*. However, a pressure fluid signal to shift valve 144 to position *a* will not be conducted until both tools have started to disengage their respective clutches as represented by the FIG. 5 condition. When valves 130 and 136 have both shifted to position *a* pressure fluid will be conducted to shift valve 144 to position *a* whereby pressure fluid will be conducted to ports 78 of tools 12 and 120 simultaneously to act on faces 99 of the pistons 70. In this way both tools will be shifted to the low speed and high torque operating mode simultaneously as desired for some multiple fastener tightening operations.

Valve 144 together with check valves 146 and 150 and the restricted orifice 148 operate to maintain a slowly decaying residual pressure acting against pistons 70 to hold the tools 12 and 120 in the low speed shifted position momentarily after pressure fluid to conduits 124 and 138 has been turned off at the completion of an operating cycle. As with the single spindle tool circuit of FIG. 9 the momentary maintained downshift condition provides easy removal of the wrench sockets 152 from the tightened fasteners.

As will be appreciated from the foregoing description, additional tools may be added to the control circuit by providing a valve such as the valve 130 in series with the valve 130 for each tool added to the circuit. Each additional tool added to the system is also connected to receive pressure fluid from valve 144 in the same manner as the tools 12 and 120. Accordingly, the speed shift mechanism of the present invention is particularly adaptable to multiple spindle nutsetter apparatus wherein each individual tool unit can be controlled so that all fastener driving spindles shift simultaneously.

What is claimed is:

1. In a tool for tightening threaded fasteners and the like:

a housing;

a motor disposed in said housing;

a rotor member drivably connected to said motor;

a driven spindle;

a speed shift mechanism interconnecting said rotor member and said driven spindle and operable to reduce the speed of said driven spindle with respect to said rotor member, said mechanism including a torque responsive clutch having driving and driven members, one member being movable with respect to the other member for disengaging said clutch to cause said speed shift mechanism to reduce the speed of said driven spindle with respect to said rotor member;

said clutch including cooperable interfitting teeth disposed on said driving and driven members and responsive to torque transmitted from one member to the other to cause a separating force acting to move said one member with respect to said other member from a first engaged position to a second engaged position, said teeth being cooperable in said second engaged position to transmit torque from said driving member to said driven member without causing further movement sufficient to disengage said clutch;

a piston connected to said one member for movement with said one member, said piston being disposed in said housing to form first and second expansible chambers;

means for conducting pressure fluid to said first chamber to act on said piston for biasing said one member into engagement with said other member;

first closure means responsive to movement of said one member to said second engaged position to vent said first chamber to reduce the pressure fluid force acting on said piston;

second closure means responsive to movement of said one member to said second engaged position for causing said second chamber to change from a vented condition to a substantially closed condition; and, means for conducting pressure fluid to said second chamber to act on said piston for moving said one member to disengage said clutch when said second chamber is in a substantially closed condition.

2. The invention set forth in claim 1 wherein: said first closure means comprises a first annular flange formed on and extending axially from said piston and including seal means for sealing engagement with a cooperable seat in said housing.

3. The invention set forth in claim 2 wherein: said second closure means comprises a second annular flange formed on and extending axially from said piston on the opposite side of said piston with respect to said first annular flange of said first closure means, and seal means disposed on said second annular flange for sealing engagement with a cooperable seat in said housing.

4. The invention set forth in claim 1 wherein: said teeth disposed on one of said members comprise axially sloping surface portions and axially aligned surface portions and said teeth on said other member comprise surface portions cooperable with said axially aligned surface portions for driving engagement between said clutch members in said second engaged position.

5. The invention set forth in claim 1 wherein: said driving member is connected to said rotor member and said piston, and said driving member is movable in response to a predetermined torque transmitted by said clutch to move said piston to vent said first chamber and close said second chamber.

6. The invention set forth in claim 5 wherein: said speed shift mechanism includes a planetary gear set including a sun gear, planetary gear means engaged with said sun gear and mounted on a planetary gear carrier, and said planetary gear carrier comprises said driven member and is connected to said driven spindle for driving said driven spindle at the speed of said rotor member when said clutch is engaged.

7. The invention set forth in claim 6 wherein: said planetary gear set includes a ring gear engaged with said planetary gear means and rotatable with said planetary gear carrier when said clutch is engaged.

8. The invention set forth in claim 7 wherein: said speed shift mechanism includes a one-way clutch operable to prevent the rotation of said ring gear when said clutch is disengaged.

9. The invention set forth in claim 1 wherein: said means for conducting pressure fluid to said first chamber comprises a first conduit and pressure regulating means in said first conduit for regulating the pressure of fluid in said first chamber acting on said piston means to control the torque at which said one member moves toward said second engaged position with respect to said other member; and said means for conducing pressure fluid to said second chamber includes a second conduit and valve means interposed in said second conduit for controlling the flow of pressure fluid to said second conduit.

10. The invention set forth in claim 9 together with: valve means in communication said second conduit and operable to provide controlled venting of said second chamber to delay the reengagement of said clutch.

11. The invention set forth in claim 9 wherein: said tool is disposed in a multiple tool arrangement including at least a second and like tool; said valve means interposed in said second conduit is power operated to control the flow of fluid through said second conduit to the second chamber of each tool in said multiple arrangement; and said multiple tool arrangement further includes operated valves associated with each tool and interposed serially in a third conduit and normally conditioned to prevent the flow of pressure fluid through said second conduit to said second chambers of said tools, said power operated valves each being responsive to the venting of pressure fluid from said first chamber of said respective tool to be actuated, and whereby in response to all of said power operated valves being actuated, said valve means is operated to conduct pressure fluid to said second chamber of each tool for disengaging said clutches.

* * * * *